July 1, 1958     C. J. KOTCHAN     2,840,883
FIXTURE ALIGNER FOR USE WITH T-SLOT TABLE
Filed Jan. 14, 1957     2 Sheets-Sheet 1

*INVENTOR.*
CHARLES J. KOTCHAN
BY
*Knox & Knox*

July 1, 1958  C. J. KOTCHAN  2,840,883
FIXTURE ALIGNER FOR USE WITH T-SLOT TABLE
Filed Jan. 14, 1957  2 Sheets-Sheet 2

INVENTOR.
CHARLES J. KOTCHAN
BY
Knox & Knox

United States Patent Office 2,840,883
Patented July 1, 1958

2,840,883

FIXTURE ALIGNER FOR USE WITH T-SLOT TABLE

Charles J. Kotchan, San Diego, Calif.

Application January 14, 1957, Serial No. 633,933

7 Claims. (Cl. 29—1)

This invention relates generally to accessories for machine tools, and more particularly to a unit which is used in pairs to align a jig fixture, or like element with a slot in the machine tool table.

While it is regarded that the principal field of use for this invention is in the immediately preceding sentence, it is conceived that the units described herein may be used in a different environment, and it is particularly noteworthy that the slots in the supporting element, herein referred to as the table, need not be of the conventional T-slot form. The instant invention is primarily developed for use with jigs and fixtures of considerable mass, although the device can be used to facilitate and accelerate the positioning of various elements in relation to a slotted table. In conventional practice, base portions of the heavy jig or fixture are provided with positioning pins and the fixture is elevated and moved onto the table, usually with some difficulty when the fixture is large, so that the said pins will enter the required slots in the machine tool table. Damage to the table is frequent under these circumstances, especially when a crane is required for the placement of the fixture. It is a feature of this invention, therefore, to provide means whereby the fixture can be located approximately in alignment with one of the slots, with the present aligning means easily inserted in the required slot due to the fact that the instant aligning plugs can be rotated so as to present a small dimension when measured transversely of the slot. After the fixture is thus approximately positioned, the accurate positioning of the same is easily accomplished by the rotation of the said aligning plugs in the manner which will be hereinafter fully set forth.

A primary object of this invention is, therefore, to provide a means for facilitating and accelerating the accurate positioning of any heavy jig or fixture on a machine tool table.

Another object of this invention is to provide aligning means for any element which must be positioned accurately with relation to a slot in a supporting structure.

Another object of this invention is to provide aligning means for fixtures and the like, the means being characterized by the employment of plugs which are easily loosened and removed prior to the removal of the fixture from the table.

Still another object of this invention is to provide aligning means featuring the use of an aligning plug and including means for prevention of the inadvertent loosening of the plug during a machine tool operation.

And a last object to be mentioned specifically is to provide a device of the character mentioned above which is extremely versatile in use, the exact sizes and proportions being matters easily determined to suit particular conditions and needs, which is safe for workmen to use, and which is generally durable and efficient in service.

With these objects definitely in view, along with other objects which will appear to those skilled in the art to which this invention appertains as this description proceeds, this invention resides in the novel construction, combination and arrangement of elements and portions as will be hereinafter fully described in the specification, particularly pointed out in the appended claims, and illustrated in the accompanying drawings, in which:

Figure 1 is an isometric view showing a machine tool table and a base portion of a fixture fragmentarily, and including a representation of the instant aligning means with the bushing portion thereof fixed in the said fixture base portion and with the plug portion thereof disposed thereabove and ready to be inserted, this figure also showing a T-bolt and it will be understood that this T-bolt will ordinarily not be tightened when the plug portion of the aligner is in the position illustrated;

Figures 6, 7:
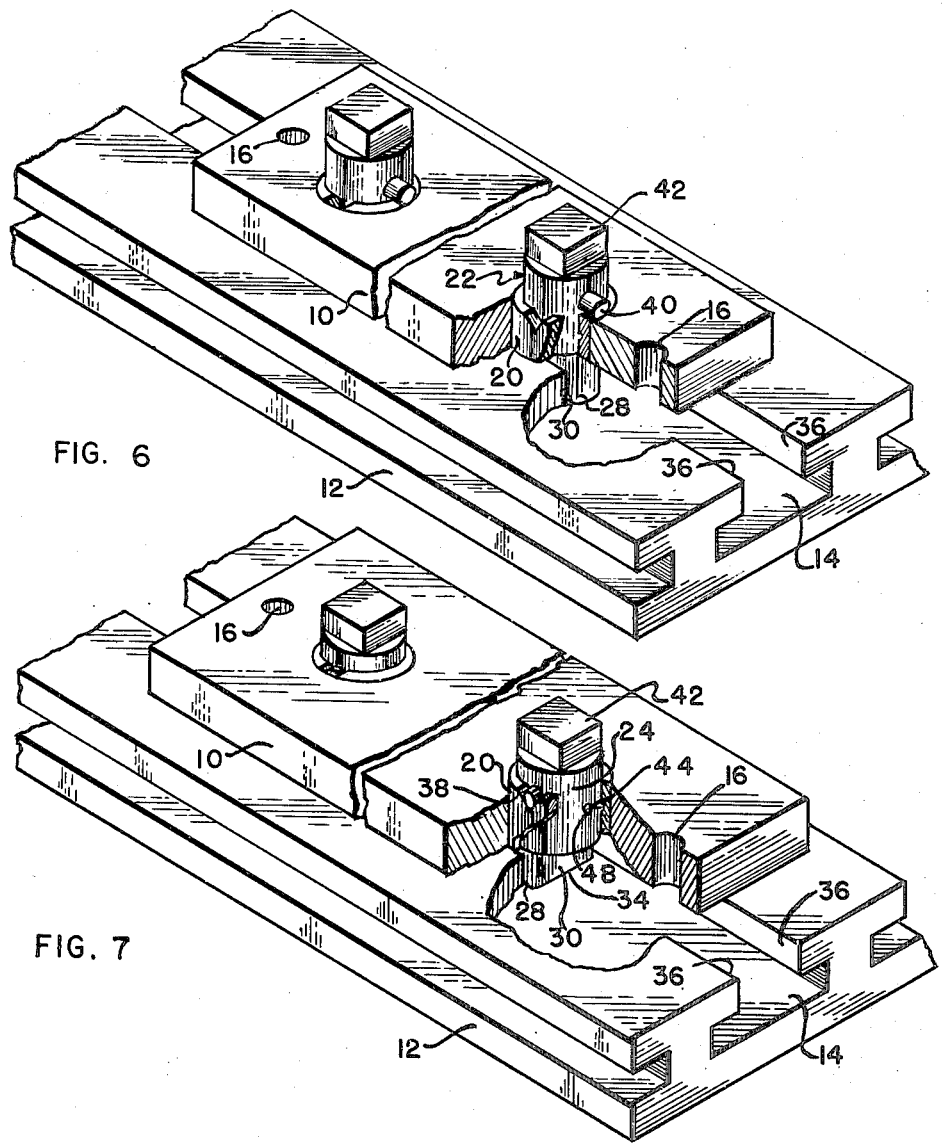

Figure 6 is an isometric fragmentary view of a machine tool table with a base portion of a jig represented somewhat diagrammatically positioned thereon and with the aligning devices described herein incorporated with the said base portion and with the plugs thereof turned to the position allowing easy insertion thereof into the slots of the machine tool table, prior to the accurate aligning of the fixture; and Figure 7 is a view, similar to Figure 6 and showing the plugs turned through approximately 90° from the positions shown in Figure 6, this figure indicating the positions of the various parts assumed when the fixture has been properly aligned with the slot in the machine tool table.

Similar characters of reference indicate similar or identical elements and portions throughout the specification and throughout the different views in the drawings.

Figure 1:
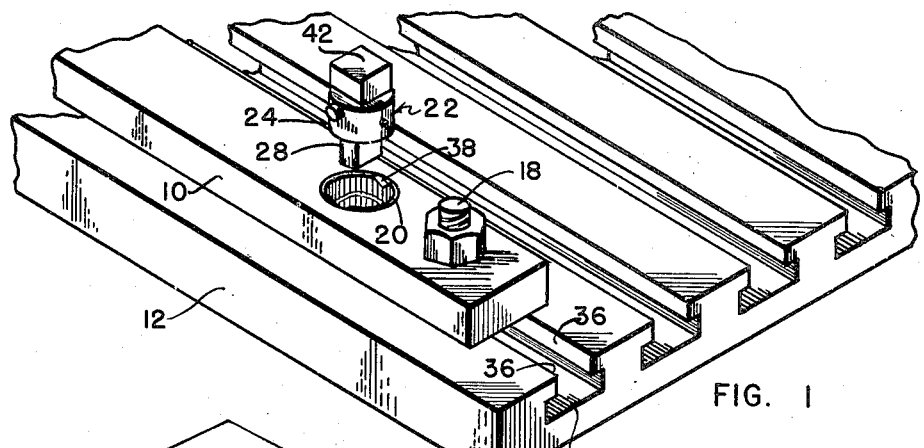

Referring now to the drawings in detail, I will first mention briefly the environment wherewith this invention is used, this environment ordinarily including a jig or fixture, the block form 10 in Figures 1, 6 and 7 being used herein to represent a portion of such jig or fixture, usually a base portion thereof, and the machine tool table is indicated fragmentarily at 12. This table will be provided with slots, ordinarily T-slots, extending in parallel relation in the upper surface of the table. The base portion 10 is provided with holes 16 to receive T-bolts, one of which is indicated at 18, after alignment has been accomplished. It will, of course, be understood that the aligners disclosed herein are used in pairs, as indicated in Figures 6 and 7.

Coming now to a description of the aligners per se, each aligner includes a bushing 20 and a plug generally indicated at 22. The plug 22 comprises a central cylindrical portion 24 which is accurately machined for close tolerance fit in the bore 26 of the bushing 20. The plug 22 is provided with a cam element having curved surface segments 28 and flat surfaces 30, these surfaces being parts of a flatted cylindrical portion of the plug extending axially from the central cylindrical portion 24 and having a diameter somewhat less than the diameter of the portion 24. A shoulder 32 is defined between the surfaces 28 and 30 and the adjacent end of the portion 24. For convenience, the part comprising the surfaces 28 and 30 may be referred to herein as the cam 34, and the length of this cam is preferably, although not necessarily, of a dimension substantially equal to the vertical dimension of the slot faces 36 of the T-slots 14 already mentioned.

The bushing 20 is provided with a pair of opposed inclined plane surfaces or notches 38 at one end thereof, ordinarily the upper end, and these notches receive the pins 40 when the plug 22 is turned into the position illustrated in Figure 7. As will be more clearly discussed below, this turning of the plug is required in order to remove the jig or fixture from a preliminary approximate alignment into accurate alignment with the slot 14, and this turning is accomplished by the use of a tool applied to the tool receiving terminal 42 of the plug.

The bushing 20 has an internal annular groove 44 for coaction with a spring detent assembly in the plug 20. This spring detent assembly includes a sleeve casing 46 and a ball 48 biased by a spring 50 which is compressed between an inwardly crimped terminal portion of the casing 46 and the ball, the outer end of the casing being also crimped or deformed to hold the ball against escape, it being understood that the casing 46 will be pressed into a bore in the cylindrical portion 24 of the plug. When the plug has been turned into the position indicated in Figure 7, the ball 48 will engage the groove 44 and restrain the plug from inadvertent withdrawal from the bushing.

The operation of this invention will be clearly understood from a consideration of the foregoing description of the mechanical details thereof, taken in connection with the foregoing recitation of the objects of the invention. However, in recapitulation, it should be noted that the jig, fixture or like element, generally represented at 10 will be provided with bores to receive the bushings 20, these bushings being ordinarily press fitted into these bores and these bushings will ordinarily be hardened and accurately machined to receive the central cylindrical portion 24 of the corresponding plug 22. The approximate alignment with the slots 14 is accomplished by any of the usual methods, although it is very important to note that the bushings 20 will not extend below the lower face of the jig or fixture or other element indicated at 10, so that the sliding of this element into approximate alignment with the slot 14 is greatly facilitated. After such approximate alignment is accomplished, plugs 22 are inserted in the bushings 20 and the plugs will, of course, be positioned so as to present the flat surfaces 30 toward the slot faces 36, thus making the insertion of the plugs an easy matter even when the alignment of the fixture with the slot is only a rough approximation. A wrench is then applied to the tool receiving terminals 42 and the plugs 22 are turned from the positions indicated in Figure 6 to the positions indicated in Figure 7, the cam 34 being effective in forcing the element 10 laterally on the table 12, since the curved surfaces 28 frictionally engage the slot faces 36 and push the element 10 into place as the plugs are turned. Of course, the diameter or maximum dimension of the cams 34 must be equal to the corresponding dimension between the faces 36, the machining tolerances allowed being a matter to be determined in the individual instances. When the element 10 has been properly positioned, the T-bolts 18, or analogous fastening devices, will be secured according to conventional practice. When it is desired to remove the plugs, any fastening devices such as the T-bolts 18 will preferably be first loosened or removed and the plugs 22 will be turned from the positions indicated in Figure 7 back to the positions indicated in Figure 6. The pins 40, riding on the inclined surfaces 38 will force the partial withdrawal of the plugs 22 and the spring detents will no longer be effective and the plugs will be easily removed. In this connection it should be noted that the pins 40 constitute means to indicate the correct operative position of the plugs 22, since the inclined surfaces or notches 38 will be positioned to indicate the operative or aligned positioning of the same, as well as functioning as means for the partial withdrawal of the plugs from the bushings 20.

The foregoing description and drawings are proposed as illustrative rather than limiting. Minor variation from the form disclosed may be resorted to, all within the scope and spirit of this invention. For example, the tool receiving terminals could be sockets in the corresponding ends of the plugs 20, and the cams 34 need not be of the exact form illustrated. Furthermore, the pins 40 and inclined surfaces or notches 38 could be modified considerably while retaining the disclosed function, and the spring detent assembly could be replaced by a leaf spring acting upon the outer or upper end of the plugs, or the spring detent assembly and groove 44 could be reversed without changing the general function thereof. Many other minor variations will occur to those skilled in the art to which this invention appertains, and I wish to be limited only by the metes and bounds imposed on this invention by the following claims.

I claim:

1. An aligner for use in pairs in aligning jigs, fixtures and the like on a table with a slot therein, comprising: a bushing for rigid securement in the base of the jig; a plug accurately fitted in said bushing for rotation therein; said plug including an axially protruding portion extending downwardly beyond said bushing; said protruding portion constituting a cam adapted to fit snugly between confronting slot faces in the table wherewith the aligner is to be used when the cam is in operative position, and to fit loosely between said slot faces when the cam is in inoperative position; and means for forcefully partially rotating said plug from said inoperative position to said operative position to shift the jig relative to the table.

2. Apparatus according to claim 1 wherein said protruding portion is a flatted cylinder with diametrically opposed, curved surface constituting working faces and segments spaced to correspond with the width of a slot in the table wherewith the aligner is to be used, and opposing flat segments spaced apart a distance considerably less than said width of a slot in the table so that said protruding portion is easily inserted into and withdrawn from such slot when turned with the flat segments parallel to the slot.

3. An aligner for use in pairs in aligning jigs, fixtures and the like on a table with a slot therein, comprising: a bushing for rigid securement in the base of the jig; a plug accurately fitted in said bushing for rotation therein; said plug including an axially protruding portion extending downwardly beyond said bushing; said protruding portion constituting a cam adapted to fit snugly between confronting slot faces in the table wherewith the aligner is to be used when the cam is in operative position, and to fit loosely between said slot faces when the cam is in inoperative position; and means for forcefully partially rotating said plug from said inoperative position to said operative position to shift the jig relative to the table; said plug having means for indicating the position of said cam and also constituting means for positively restraining said plug from axial movement relative to said bushing in one direction.

4. An aligner for use in pairs in aligning jigs, fixtures and the like on a table with a slot therein, comprising: a bushing for rigid securement in the base of the jig; a plug accurately fitted in said bushing for rotation therein; said plug including an axially protruding portion beyond said bushing to engage a slot face in said table; said protruding portion constituting a cam for coaction with said slot face; and means for partially rotating said plug to shift the jig relative to the table; said plug and bushing having cooperating means to move said plug axially thereof when rotated through a given segment of rotation relative to said bushing.

5. An aligner for use in pairs in aligning jigs, fixtures and the like on a table with a slot therein, comprising: a bushing for rigid securement in the base of the jig; a plug accurately fitted in said bushing for rotation therein; said plug including an axially protruding portion beyond said bushing to engage a slot face in said table; said protruding portion constituting a cam for coaction with said slot face; and means for partially rotating said plug into operative position with said cam engaging said slot face and thereby shifting the jig relative to the table; and means to shift the plug axially to the bushing, as in removal of the plug, comprising an inclined plane surface on said bushing and a pin extending radially of said plug to engage said inclined plane surface when the plug is partially rotated away from said operative position.

6. An aligner according to claim 1 wherein said bushing has a V-shaped notch on the end thereof remote from said protruding portion; a pin secured to said plug and extending radially therefrom into said notch when the plug is in operative position; said notch defining an inclined plane upon which said pin rides to shift the plug axially when the plug is partially rotated.

7. An aligner according to claim 6 and wherein said bushing has an internal annular groove; a spring detent in said plug operatively associated with said groove, whereby said pin, inclined plane, spring detent and groove coact to bias the plug toward the position thereof corresponding to said operative position of the cam.

References Cited in the file of this patent

UNITED STATES PATENTS

| | | |
|---|---|---|
| 468,000 | Tomek | Feb. 2, 1892 |
| 2,308,493 | Rentiis | Jan. 19, 1943 |
| 2,424,871 | Wenk | July 29, 1947 |

UNITED STATES PATENT OFFICE

CERTIFICATE OF CORRECTION

Patent No. 2,840,883                      July 1, 1958

Charles J. Kotchan

It is hereby certified that error appears in the above numbered patent requiring correction and that the said Letters Patent should read as corrected below.

Figures 2, 3, 4:
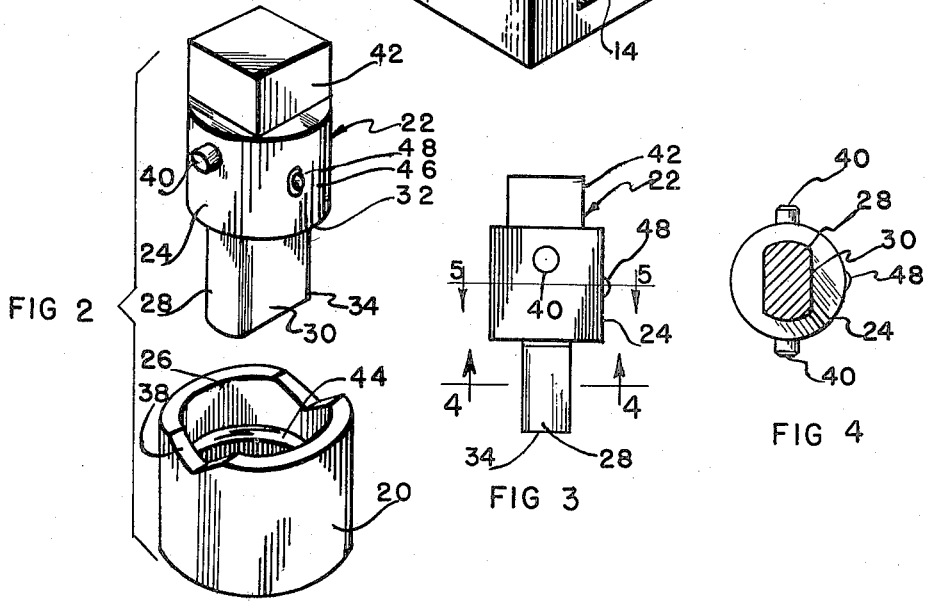
Figure 2 is a group view, isometric in character, showing the plug and bushing.
Figure 3 is a side elevational view of the plug.
Figure 4 is a horizontal sectional view fixed substantially on the line 4 in Figure 3.
Figure 5:
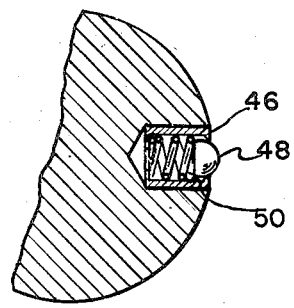
Figure 5 is a fragmentary sectional view taken substantially on the line 5—5 in Figure 3, this figure being on a considerably enlarged scale.

In the drawings, the sheet headed by Patent No. 2,840,884, comprising Figures 1 and 2, was inadvertently inserted in the official grant (only) of Letters Patent No. 2,840,883 and should be canceled.

Signed and sealed this 23rd day of September 1958.

(SEAL)
Attest:

KARL H. AXLINE
Attesting Officer

ROBERT C. WATSON
Commissioner of Patents